(12) United States Patent
Behm

(10) Patent No.: US 12,111,899 B2
(45) Date of Patent: Oct. 8, 2024

(54) AUTHENTICATION SYSTEMS AND METHODS FOR AEROSPACE SYSTEMS

(71) Applicant: Gentex Corporation, Zeeland, MI (US)

(72) Inventor: Michael F. Behm, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 88 days.

(21) Appl. No.: 17/075,831

(22) Filed: Oct. 21, 2020

(65) Prior Publication Data
US 2021/0117527 A1 Apr. 22, 2021

Related U.S. Application Data

(60) Provisional application No. 62/923,867, filed on Oct. 21, 2019.

(51) Int. Cl.
| | | |
|---|---|---|
| G06F 21/00 | (2013.01) | |
| G06F 21/32 | (2013.01) | |
| G06F 21/44 | (2013.01) | |
| G07C 9/25 | (2020.01) | |

(52) U.S. Cl.
CPC .............. G06F 21/32 (2013.01); G06F 21/44 (2013.01); G07C 9/25 (2020.01)

(58) Field of Classification Search
CPC ............ G06F 21/32; G06F 21/44; G07C 9/25
See application file for complete search history.

(56) References Cited

U.S. PATENT DOCUMENTS

| | | | |
|---|---|---|---|
| 7,376,494 B2 | 5/2008 | Arnouse | |
| 9,111,075 B1* | 8/2015 | Moore | ................... G06F 21/31 |
| 9,516,352 B2 | 12/2016 | Keen et al. | |
| 10,817,675 B2* | 10/2020 | Watson | ............... G09B 21/006 |
| 2008/0022100 A1 | 1/2008 | Ginter et al. | |
| 2009/0234703 A1* | 9/2009 | Rasheed | ............... G06Q 10/06 |
| | | | 705/28 |
| 2010/0162327 A1 | 6/2010 | Bonar | |

(Continued)

OTHER PUBLICATIONS

Gates et at. "Identification, Convenience, and Unparalleled Security For All—Biometrics Popularity Grows in Airports and With Travelers" Jul. 1, 2000. URL: http://ibia.vwh.net/press520release52016.htm See p. 2, paragraph 7, and p. 4, paragraph 1.

*Primary Examiner* — Rodman Alexander Mahmoudi
(74) *Attorney, Agent, or Firm* — Price Heneveld LLP; Brian James Brewer

(57) ABSTRACT

An authentication system includes a communication circuit configured to communicate with a remote server and at least one scanning apparatus configured to capture biometric data. The system further includes a controller in communication with the communication circuit and the scanning apparatus. The controller is configured to receive a request for a security authorization and capture the biometric data with the scanning apparatus. The controller is further configured to compare the biometric data to authentication data. The authentication data includes an identification profile configured to authenticate a previously identified individual. The controller is further configured to authenticate the previously identified individual based on the identification profile and communicate a privilege level associated with the identification profile to the air travel device.

12 Claims, 4 Drawing Sheets

(56) References Cited

U.S. PATENT DOCUMENTS

| | | | |
|---|---|---|---|
| 2010/0205105 A1* | 8/2010 | Robertson | G06Q 10/025 |
| | | | 705/334 |
| 2014/0051498 A1* | 2/2014 | Bieler | A63F 13/12 |
| | | | 463/25 |
| 2014/0294255 A1* | 10/2014 | Kammer | G07C 9/33 |
| | | | 382/118 |
| 2016/0148449 A1* | 5/2016 | God | G07C 9/257 |
| | | | 340/5.6 |
| 2017/0048239 A1* | 2/2017 | Jeon | H04W 12/065 |
| 2017/0372541 A1 | 12/2017 | Attar | |
| 2018/0025296 A1* | 1/2018 | Fox | G06Q 10/02 |
| | | | 705/5 |
| 2018/0097804 A1 | 4/2018 | Boehm | |
| 2018/0247037 A1* | 8/2018 | Weller | G06F 21/32 |
| 2019/0188508 A1 | 6/2019 | Zebley et al. | |
| 2019/0311632 A1* | 10/2019 | Hochwarth | H04W 12/08 |
| 2019/0392659 A1* | 12/2019 | Seenivasagam | G07C 9/37 |

* cited by examiner

AUTHENTICATION SYSTEMS AND METHODS FOR AEROSPACE SYSTEMS

CROSS-REFERENCE TO RELATED APPLICATIONS

This application claims priority under 35 U.S.C. § 119(e) and the benefit of U.S. Provisional Application No. 62/923,867 entitled AUTHENTICATION SYSTEMS AND METHODS FOR AEROSPACE SYSTEMS, filed on Oct. 21, 2019, by Michael F. Behm, the entire disclosure of which is incorporated herein by reference.

TECHNOLOGICAL FIELD

The present disclosure relates generally to a security accessory for an aviation application and, more particularly, relates to security accessory configured to assist in an authentication of an airline customer, occupant, and/or personnel.

SUMMARY

In one aspect, the disclosure provides for an authentication system in communication with an air travel device. The authentication system comprises a communication circuit configured to communicate with a remote server. At least one scanning apparatus is configured to capture biometric data and a controller is configured to receive a request for a security authorization. The controller is further configured to capture the biometric data of a user with the scanning apparatus and compare the biometric data to authentication data. The authentication data comprises an identification profile configured to authenticate a previously identified individual. The controller is further configured to authenticate the user based on the identification profile and communicate a privilege level associated with the identification profile to the air travel device.

In another aspect, the disclosure provides for a method for authenticating a user privilege for an air travel activity. The method comprises receiving a request for a security authorization via a user interface and capturing biometric data of a user with the scanning apparatus. The method further comprises comparing the biometric data to authentication data. The authentication data comprises an identification profile configured to authenticate a previously identified individual. The method further comprises authenticating the user based on the identification profile and communicating a privilege level associated with the identification profile.

In yet another aspect, the disclosure provides for a passenger kiosk for an air travel activity including a user interface comprising a display screen. The passenger kiosk further comprises a communication circuit configured to communicate with a remote server and a first scanning apparatus configured to capture biometric data. A controller is configured to receive a request for a security authorization via the user interface and capture the biometric data of a user with the scanning apparatus. The controller is further configured to compare the biometric data to authentication data. The authentication data comprises an identification profile configured to authenticate a previously identified individual. The controller is further configured to authenticate the user based on the identification profile and access ticketing data of the user based on the privilege level associated with the identification profile. The controller is further configured to communicate at least one of an entertainment content, payment information, and a user authorization of the user to a passenger seat infotainment system of an aircraft corresponding to a seat identified by the ticketing data.

These and other features, advantages, and objects of the present device will be further understood and appreciated by those skilled in the art upon studying the following specification, claims, and appended drawings.

DETAILED DESCRIPTION OF EMBODIMENTS

It is to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In various embodiments, the disclosure provides for an authentication system for an air travel device. The authentication system may be configured to capture identifying information for a user in order to authorize specific privileges, account access, boarding information, and additional functions or operations that may be related to air travel. For example, in some embodiments, the disclosure may provide for a scanning apparatus configured to detect one or more identifying characteristics of an occupant or potential occupant attempting to board the aircraft. The scanning apparatus may be incorporated in one or more systems related to air travel including, but not limited to, a ticketing or boarding kiosk, a passenger information or entertainment device, and/or cockpit or personnel access portal.

Figure 1:
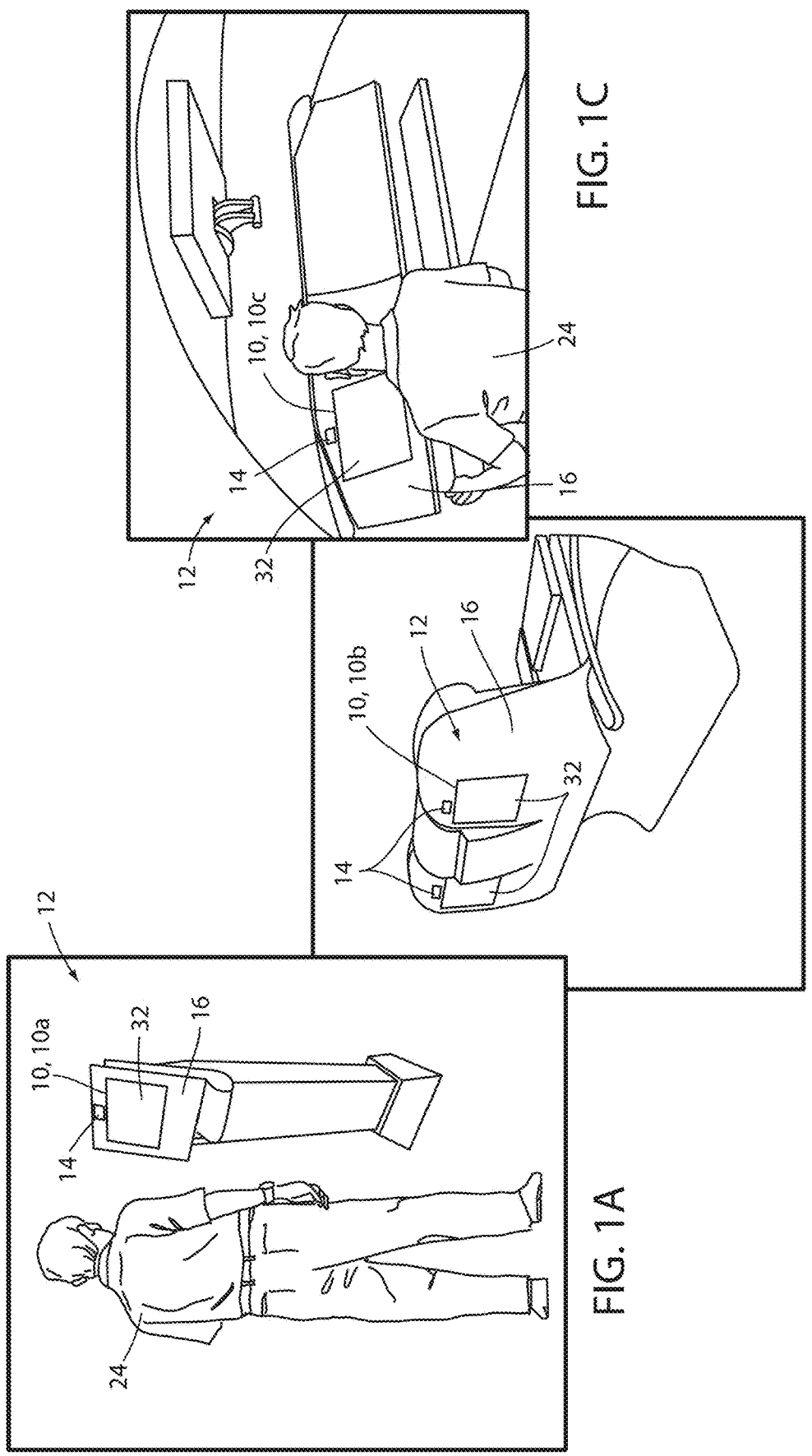
FIG. 1A is a projected view of a kiosk associated with an air travel application comprising an authentication system.
FIG. 1B is a projected view of a passenger information or entertainment device comprising an authentication system.
FIG. 1C is a projected view of a cockpit or personnel access portal of an aircraft comprising an authentication system.
Figure 2:
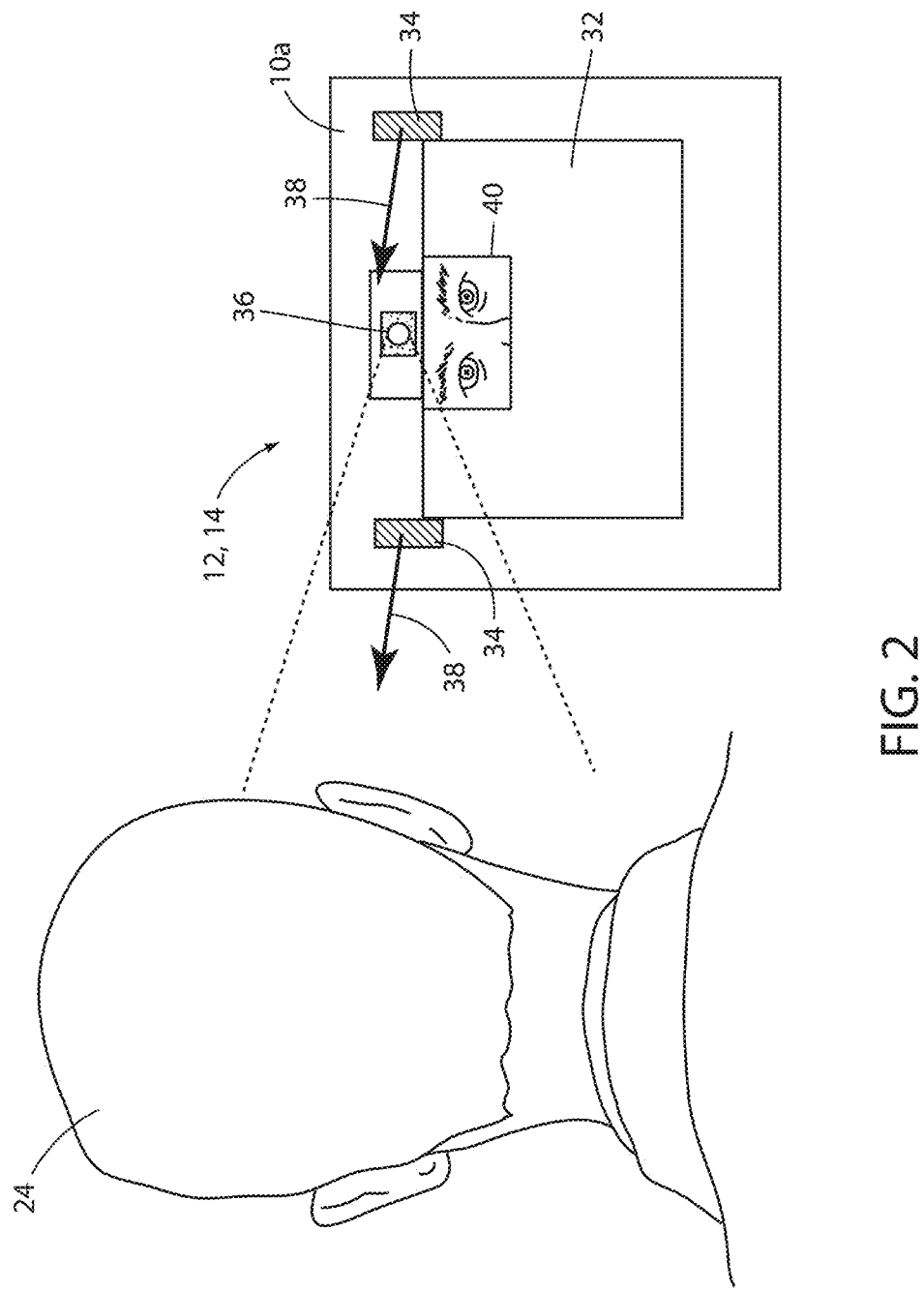
FIG. 2 is a schematic diagram of a scanning apparatus associated with an air travel activity.

FIGS. 1A, 1B, and 1C demonstrate projected views of a ticketing or boarding kiosk 10a, a passenger information or entertainment device 10b, and/or cockpit or personnel access portal 10c. FIG. 2 demonstrates a schematic diagram of an authentication system 12 associated with an air travel activity. Referring now to FIGS. 1 and 2, the devices 10 may more generally be related to devices that may be utilized by passengers, flight crew, and/or authorized personnel in relation to air travel activities. As illustrated, each of the access devices 10 may comprise an authentication system 12. Each of the devices 10 may correspond to devices related air travel applications including, but not limited to, ticketing, baggage checking and claiming, boarding, personnel authorization, payment and account access, etc. In general, the air travel applications described herein may relate to operations and security provisions that may be implemented to authorize access and retrieve personalized information for commercial or passenger airline travel applications. Though discussed in reference to specific examples, the devices 10 provided by the disclosure may be applied to similar applications without departing from the spirit of the disclosure.

In various implementations, the authentication system 12 may be incorporated in each of the devices 10 and may comprise a scanning apparatus 14. The scanning apparatus 14 may be incorporated on an exterior portion 16 of a housing or existing article that may be related to a ticketing, boarding, control panel, or additional systems that may relate to air travel. Accordingly, the scanning apparatus 14 may be flexibly configured to provide for a collection or capture of scanning data or biometric data to support an identity authentication that may be implemented to authorize access of a user to various systems associated with air travel. In some embodiments, the authentication system 12 may be in communication with remote server or database, which may be configured to store authorization credentials, access authentication templates, and control a variety of systems and subsystems related to the devices 10.

The scanning apparatus 14 may correspond to a biometric scanner configured to capture biometric data or scanning data of a user or a passenger 24 of an aircraft. For example, the scanning apparatus 14 may correspond to an iris imager or scanner, fingerprint scanner, face imager or scanner, voice scanner/recorder, or various other scanning devices. In some embodiments, scanning apparatus 14 may be incorporated in one or more of the devices 10. The scanning data captured by and/or associated with the scanning apparatus 14 may be saved in a local memory or a remote cloud server that may be accessible via a communication interface. In this way, the authentication system 12 may access the local memory or a remote server to search and match scanning data or biometric data to an identification profile to identify the user 24. For clarity, a passenger, flight crew member, pilot, or other authorized personnel will all be referred to as the user 24.

As discussed herein, the terms identification and authentication may generally refer to an analysis completed by the authentication system 12 configured to identify the user 24. The disclosure provides for various embodiments configured to provide at least one authentication routine configured to securely indicate an identity of the user 24. Accordingly, the authentication may provide for an identification of an a ticketed passenger, an assigned flight crew member, and grant access and/or privileges to the passengers and/or flight crew to various features and controls that may be related to the device 10.

Based on the identification profile, the authentication system 12 may access and/or update a variety of preferences and/or operational parameters of the devices 10. For example, the authentication system may be configured to authenticate the user 24 and communicate the authentication to the corresponding device 10. In response to the authentication of the user 24, the device 10 may be configured to receive or identify a plurality of usage and/or access parameters associated with the user 24 and the identification profile. The occupant parameters may include, but are not limited to, one or more of the following authorizations, privileges, settings or preferences: entertainment preferences, boarding authorization, travel itinerary, user or loyalty account, user privileges, entertainment preferences and/or services, membership accounts, departure and arrival location information, payment information for purchases, and additional information that may be accessed and utilized by a passenger of an aircraft. Similarly, the authentication system 12 may be configured to access operational privileges for one or more flight crew members or authorized airline personnel including, but not limited to, access to aircraft operational settings, flight controls, cockpit access, travel itinerary information, landing instructions and clearance, terminal/gate taxi instructions, flight crew profiles and information, and additional flight information.

For example, in reference to the kiosk 10a demonstrated in FIG. 1A, the authentication system 12 may be configured to access boarding pass information, payment information, customer loyalty account information and various information related to passenger boarding and/or baggage check/claiming operations. As demonstrated in FIG. 1B, the authentication system 12 may identify a passenger in the aircraft and access/personalize a variety of settings for the operation of the passenger information or entertainment device 10b based on user account information or preferences associated with the user 24. For example, the passenger information or entertainment device 10b may load a variety of user preferences and/or account information based on the authentication including, but not limited to, an itinerary, seating assignment, user account, user privileges, entertainment preferences and/or services, membership accounts, flight information, itinerary, departure and arrival information, delays connecting flight information, flight terminals, menu options and payment authorization, etc.

Additionally, as demonstrated in FIG. 1C, the authentication system 12 may be configured to access information and authorization/usage privileges related to the flight crew and/or authorized air travel personnel. For example, based on the identity of the user 24, the system 12 may access or provide security privileges related to aircraft operations and access privileges, cockpit access, maps, landing instructions and clearance, terminal/gate taxi instructions, flight crew profiles and information, flight information, passenger information, etc. Accordingly, the authentication system 12 may be flexibly implemented to provide for secure and efficient access for passengers, flight crew, and authorized personnel to ensure that flight operations are both secure and user-friendly.

Referring now to FIG. 2, an exemplary embodiment of the scanning apparatus 14 is shown incorporated in the kiosk 10a. As discussed herein, the scanning apparatus 14 may be operable to perform an identification or authentication function. In various implementations, the scanning apparatus 14 may be incorporated in a device comprising a display screen 32. The display screen 32 may correspond to or form a portion of a user interface (e.g., a touchscreen interface) that may be implemented in the devices 10. In this configuration, the device 10 may be configured to process a biometric scan (e.g. an eye-scan-identification) of the user 24.

A scanning operation of the scanning apparatus 14 may be initiated by activating an icon representing an "eye," which may be displayed on the display screen 32. The display of the icon may alert the user 24 to initiate identification by positioning his or her face in a particular position. The eye-scan-identification function may utilize an infrared illumination emitted toward an eye of the user 24 from one or more emitters 34 to illuminate the eye for the identification. Such illumination may be optimized in conditions allowing for a high optical transmittance in the near infrared (NIR) range, for example, wavelengths of light ranging from 800 nm to 940 nm.

To provide for the eye-scan-identification function of the authentication system 12, an image sensor 36 may be disposed proximate to the display 32. The image sensor 36 may correspond to, for example, a digital charge-coupled device (CCD) or complementary metal-oxide-semiconductor (CMOS) active pixel sensor, although may not be limited to these exemplary devices. The image sensor 36 may be in communication with the at least one emitter 34. The emitter 34 may correspond to a plurality of infrared emitter banks configured to output an emission 38 in the NIR range. Each of the infrared emitters or emitter banks may comprise a plurality of light emitting diodes, which may be grouped in a matrix or otherwise grouped and disposed proximate to the display 32. In this configuration, the scanning apparatus 14 may be configured to illuminate the eyes of the user 24, such that the image sensor 36 may capture image data including details of the irises of the eyes.

The display 32 may be disposed in device 10 (e.g. the kiosk 10a) and may be operable to display the image data 40 received from the image sensor 36, such that the occupant may view the image data. The display 32 may be constructed utilizing various technologies, for example LCD, LED, OLED, plasma, DLP or other display technology. In this configuration, the user 24 may adjust a position of the eyes shown on the display 32 to position the eyes such that the scanning data or biometric data may include the necessary features required to identify the occupant. In an exemplary embodiment, the features required to identify the user 24 may correspond to features of one or more of the eyes of the user 24 (e.g. the irises).

In various embodiments, the authentication system 12 may be configured to utilize one or more communication circuits 42 to transmit or receive data from one or more remote servers or other devices. For example, in some embodiments, a controller of the authentication system 12 may be operable to send authentication data, biometric or scanning data, and various other forms of data to a remote server that may be configured to process the data to authenticate or identify an identification profile as discussed herein. Additionally, the controller may be operable to receive an authentication of the user 24, an identification profile, operating parameters or operational privileges for the aircraft, boarding, passenger systems, or various information related to one or more of the devices 10 from the remote server.

Figure 3:
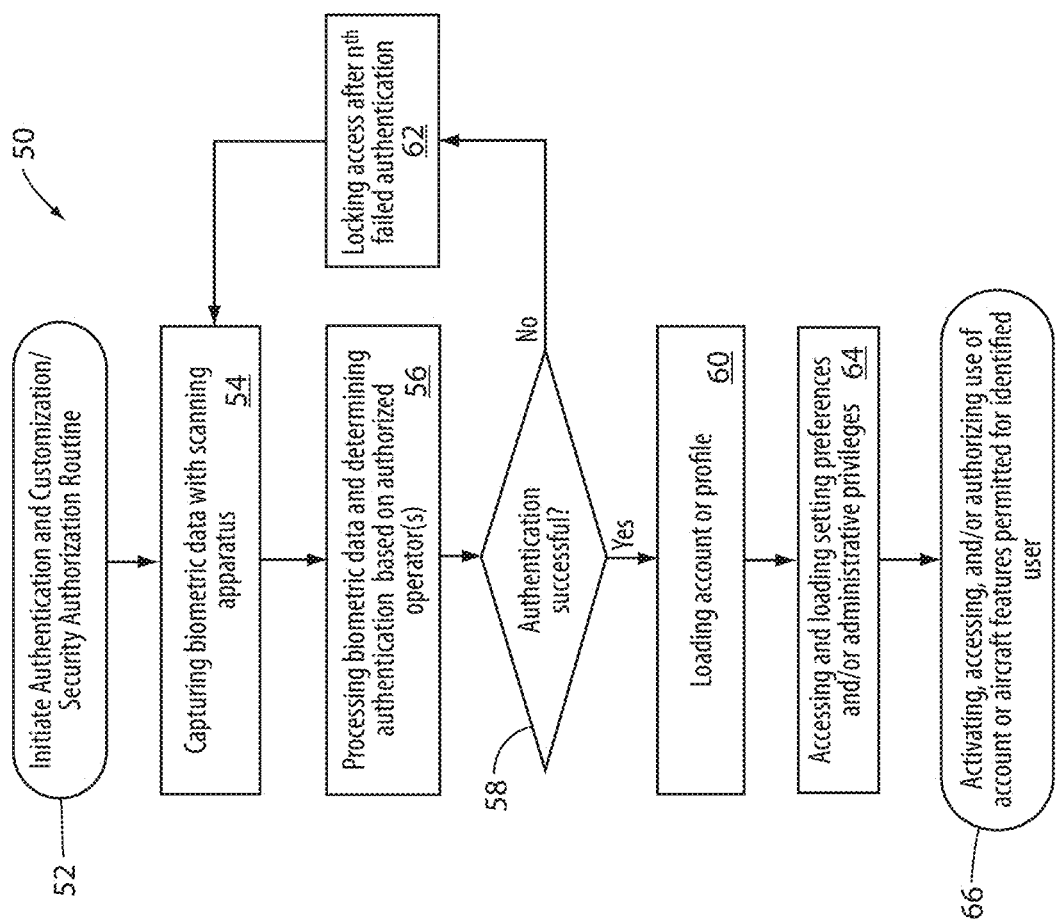
FIG. 3 is a flow chart demonstrating a method for authenticating an identity of a person associated with an air travel activity.

Referring now to FIG. 3, a flow chart of a method 50 is shown. The method 50 may be configured to authenticate an identity of the user 24 to provide for a security or usage authorization, account access, etc. of one or more of the devices 10. The method 50 may be initiated in response to a variety of requests to control or access one or more functions or settings of the devices (52). Once initiated, the method 50 may be configured to access a profile of the user to set or control the privileges and/or account settings associated with a profile of the user 24. In response to the request in step 52, the method 50 may continue to capture biometric data or scan data from one or more of the scanning apparatuses 14 (54). Once the biometric data is captured, the method 50 may continue by processing the biometric data to determine if the user 24 is authorized to perform a requested function or access information, services, etc. (56).

In step 56, the controller may proceed to determine if the authentication is successful or unsuccessful. The authentication may be considered successful if the biometric data captured for the user 24 is identified as corresponding to an authorized user and the method 50 may proceed to step 60. The authentication may be considered unsuccessful if the biometric data captured for the user 24 is not identified as corresponding to an authorized user and may return to step 54 to re-scan or capture the biometric data. If the occupant is not identified as an authorized user, after a predetermined number of failed attempts (e.g. "n" failed attempts), the controller may lock the authentication process and halt the method 50 (62). In this way, the authentication system 12 may limit access that may result from fraudulent attempts to spoof the system 12.

Upon successful authentication of the user 24, the method 50 may continue to load an account or user profile associated with the user 24 (62). Based on the account or profile, the authentication system 12 may access occupant parameters (e.g. user settings), operational privileges, and/or administrative privileges associated with the identification profile and corresponding profile or account information based on the identity of the user 24 (64). Such settings or privileges may be stored locally in a memory of the authentication system 12 and/or accessed from the remote server via the communication circuit 42. Based on the settings or privileges identified according to the authentication of the user 24, the authentication system 12 may complete the authorization routine by granting access, loading settings, or otherwise controlling use of one or more systems related to the aircraft and/or devices 10 in conformance with the settings and privileges identified in the profile or account identified for user 24 (66).

Figure 4:
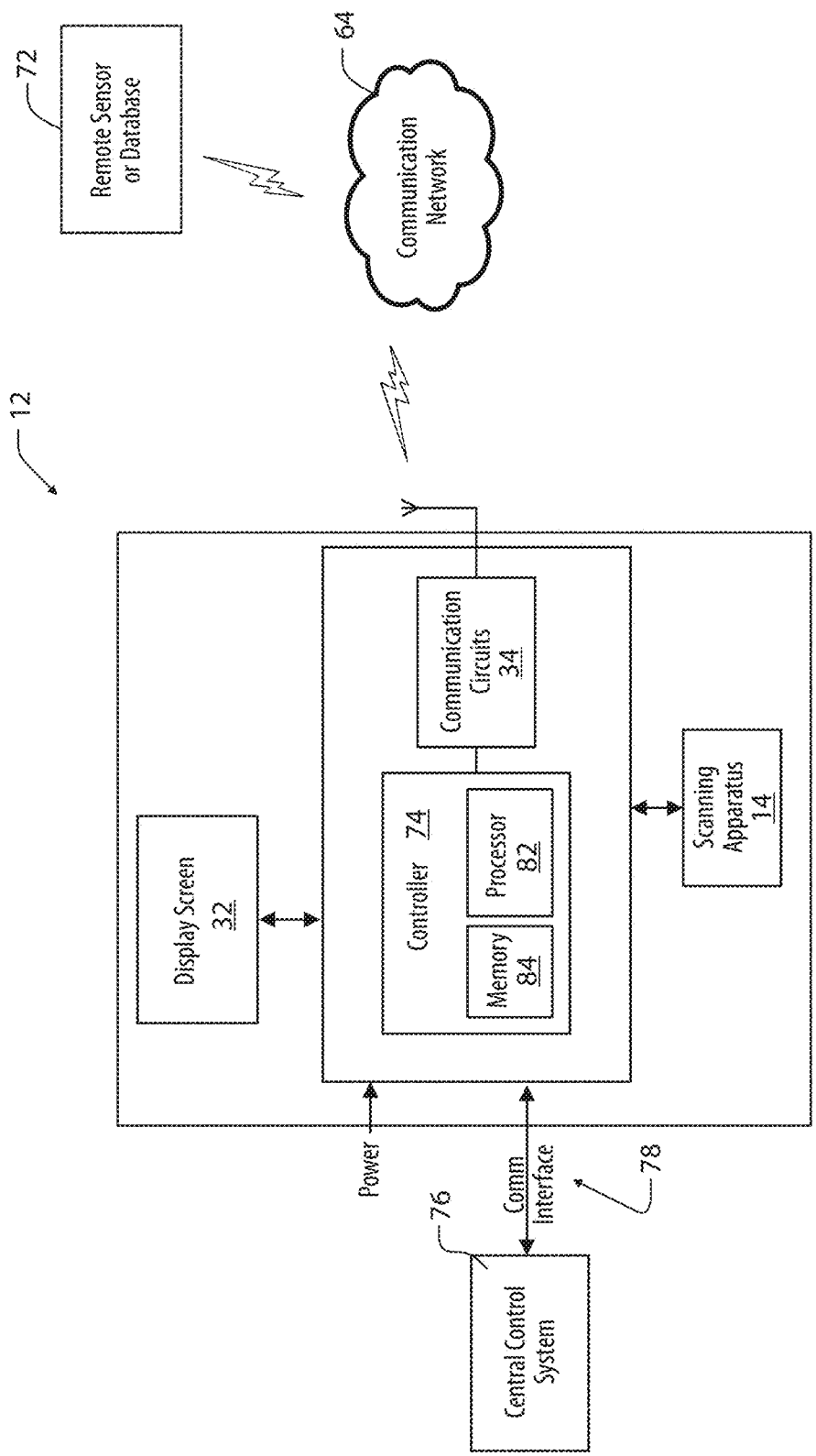
FIG. 4 is a block diagram of an authentication system demonstrated in communication with a remote server or database in accordance with the disclosure.

Referring to FIG. 4, a block diagram of the system 12 comprising the detection device 10 is shown. The system 12 may comprise one or more of the devices 10, which may be in communication via the communication circuit 42 and/or the remote server 72. Each of the devices 10 or the associated scanning apparatuses 14 may comprise a controller 74. The controller 74 may further be in communication with an aircraft control system 76 via a communication interface 78 of the aircraft. The communication interface 78 may be configured to deliver signals to the controller 74 identifying various states of the aircraft. Additionally, the controller 74 may be configured to communicate an authorization of a pilot or crew member to operate one or more systems of the aircraft via the communication interface 78, which may be particularly beneficial in relation to the personnel access portal 10c. Such control signals may be submitted from the controller 74 to control various systems of the aircraft 15 via the communication interface 78 or any form of communication (e.g. wired, wireless).

The controller 74 may comprise a processor 82 having one or more circuits configured to control various operations of the system 12. The processor 82 may be in communication with a memory 84 configured to store instructions to control operations of the scanning apparatus 14. For example, the controller 74 may be configured to access one or more authentication routines in the memory 84 and perform the authentication and authorization tasks discussed herein. Additionally, the controller 74 may be configured to access and communicated with the remote server 72 or database via the communication circuit 42 to access and update authorization credentials, access authentication template, and control a variety of systems and subsystems of the relate to the devices 10.

The communication circuit 42 may comprise one or more wireless or wired network interfaces or communication protocols. As discussed herein, wireless communication protocols may operate in accordance with communication standards including, but not limited to, ground air cellular towers, global system for mobile communications (GSM), code division multiple access (CDMA), Long Term Evolution (LTE or 4G LTE), etc., satellite-based communications; and/or variations thereof.

In one aspect, the disclosure provides for an authentication system in communication with an air travel device. The authentication system comprises a communication circuit configured to communicate with a remote server. At least one scanning apparatus is configured to capture biometric data and a controller is configured to receive a request for a security authorization. The controller is further configured to capture the biometric data of a user with the scanning apparatus and compare the biometric data to authentication data. The authentication data comprises an identification profile configured to authenticate a previously identified individual. The controller is further configured to authenticate the user based on the identification profile and communicate a privilege level associated with the identification profile to the air travel device.

In various aspects, the disclosure provides for the following steps, features, or configurations that may be implemented with the disclosure:

- the privilege level indicates an authorization to board an aircraft;
- the privilege level indicates an authorization to control an aircraft system;
- the privilege level indicates an authorization to access passenger information, a loyalty account, a user preference, and/or access a user account;
- the air travel device comprises a passenger boarding kiosk comprising a display screen, the passenger boarding kiosk having a controller, wherein the controller is configured to display boarding data of the user based on the privilege level associated with the identification profile;
- the boarding data comprises ticketing information for a subject of the biometric data;
- the air travel device comprises a security module configured to control an access door to a restricted area of an aircraft;
- the controller is further configured to control a locking mechanism of the access door in response to the privilege level;
- the air travel device comprises a pilot interface disposed in a cockpit of the aircraft;
- the controller is further configured to control an authorization of a pilot control of the aircraft in response to the privilege level;
- the air travel device comprises an access device in connection with a passenger seat of the aircraft; and/or
- the access device comprises an entertainment device configured to display video content and the privilege level identifies a user profile and, in response to the user profile, the controller displays customized content associated with the user profile on the entertainment device.

In another aspect, the disclosure provides for a method for authenticating a user privilege for an air travel activity. The method comprises receiving a request for a security authorization via a user interface and capturing biometric data of a user with the scanning apparatus. The method further comprises comparing the biometric data to authentication data. The authentication data comprises an identification profile configured to authenticate a previously identified individual. The method further comprises authenticating the user based on the identification profile and communicating a privilege level associated with the identification profile.

In various aspects, the disclosure provides for the following steps, features, or configurations that may be implemented with the disclosure:

- accessing boarding data of the user based on the identification profile; and displaying the boarding data based on the privilege level associated with the identification profile;
- the boarding data comprises baggage and ticketing information for the user;
- controlling a locking mechanism of an access door to a restricted area of the aircraft in response to the privilege level;
- controlling an authorization of a pilot control of the aircraft in response to the privilege level; and/or
- identifying a user profile of the user in response to the privilege level; and accessing at least one of an entertainment content, payment information, and a user preference of the user in response to the privilege level.

In yet another aspect, the disclosure provides for a passenger kiosk for an air travel activity comprising a user interface comprising a display screen. The passenger kiosk further comprises a communication circuit configured to communicate with a remote server and a first scanning apparatus configured to capture biometric data. A controller is configured to receive a request for a security authorization via the user interface and capture the biometric data of a user with the scanning apparatus. The controller is further configured to compare the biometric data to authentication data. The authentication data comprises an identification profile configured to authenticate a previously identified individual. The controller is further configured to authenticate the user based on the identification profile and access ticketing data of the user based on the privilege level associated with the identification profile. The controller is further configured to communicate at least one of an entertainment content, payment information, and a user authorization of the user to a passenger seat infotainment system of an aircraft corresponding to a seat identified by the ticketing data. In some aspects, the passenger seat infotainment system of the aircraft comprises a second scanning apparatus configured to capture the biometric data. The passenger seat infotainment system of the user is verified based on the biometric data captured by the second scanning apparatus.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An authentication system in communication with an air travel device, the authentication system comprising:
   an entertainment device in connection with a passenger seat of an aircraft configured to display video content;
   at least one access device comprising a security interface in connection with the passenger seat, the security interface comprising:
      a first scanning apparatus configured to process a first authentication; and
      a second scanning apparatus configured to process a second authentication; and a controller in communication with the scanning system, wherein the controller is configured to:
    receive a request for a security authorization;
    capture first biometric data of a user with the first scanning apparatus;
    processing a first authentication based on the first biometric data;
    identify a first privilege level for the user based on the first authentication, wherein the first privilege level provides access to an itinerary and preferences of the user;
    capture second biometric data different from the first biometric data with the second scanning apparatus;
    process a second authentication based on the second biometric data;
    identify a second privilege level for the user based on the second authentication, wherein the second privilege level is increased relative to the first privilege level providing editing privileges to the itinerary and purchase authorization for the user; and
    present on the entertainment device, profile information for the user including menu options and entertainment preferences.

2. The authentication system according to claim 1, wherein the first authentication is a facial scan configured to determine an identity of the user.

3. The authentication system according to claim 2, wherein the second authentication is an eye scan configured to confirm the identity of the user.

4. The authentication system according to claim 1, wherein the first privilege level further provides for the access and display of account information related to the user.

5. The authentication system according to claim 4, wherein the account information accessed with the first privilege level includes at least one of a menu preference for paid services including food and entertainment or itinerary information for the user.

6. The authentication system according to claim 1, wherein in response to the first privilege level, the controller displays customized content associated with the user profile on the entertainment device.

7. A method for authenticating passenger activity with an air travel device, the method comprising:
    capturing first biometric data of a user with a first scanning apparatus;
    processing a first authentication based on the first biometric data;
    identifying a first privilege level for the user based on the first authentication, wherein the first privilege level provides access to display account information related to the user;
    capturing second biometric data different from the first biometric data with a second scanning apparatus;
    processing a second authentication based on the second biometric data;
    identifying a second privilege level for the user based on the second authentication, wherein the second privilege level allows the user to edit itinerary information and authorize payments; and
    presenting on an entertainment device in connection with a passenger seat of an aircraft profile information for the user including menu options and entertainment preferences in response to the first privilege level.

8. The method according to claim 7, wherein the first authentication is a facial scan configured to determine an identity of the user.

9. The method according to claim 8, wherein the second authentication is an eye scan configured to confirm the identity of the user.

10. The method according to claim 7, wherein the account information accessed with the first privilege level includes at least one of a menu preference for paid services including food and entertainment or itinerary information for the user.

11. The method according to claim 7, wherein in response to the first privilege level, the controller displays customized content associated with the user profile on the entertainment device.

12. An authentication system in communication with an air travel device, the authentication system comprising:
    an entertainment device in connection with a passenger seat of an aircraft configured to display video content;
    at least one access device comprising a security interface in connection with the passenger seat, the security interface comprising:
        a first scanning apparatus configured to process a first authentication, wherein the first authentication is a facial scan configured to determine an identity of the user; and
        a second scanning apparatus configured to process a second authentication, wherein the second authentication is an eye scan configured to confirm the identity of the user; and
    a controller in communication with the scanning system, wherein the controller is configured to:
        capture first biometric data of a user with the first scanning apparatus;
        processing a first authentication based on the first biometric data;
        identify a first privilege level for the user based on the first authentication, wherein the account information accessed with the first privilege level includes at least one of a menu preference for paid services including food and entertainment or itinerary information for the user;
        capture second biometric data different from the first biometric data with the second scanning apparatus;
        process a second authentication based on the second biometric data;
        identify a second privilege level for the user based on the second authentication, wherein the second privilege level provides for editing itinerary information or payment authorization for the user; and
        present on the entertainment device profile information for the user including menu options and entertainment preferences in response to the first privilege level.

\* \* \* \* \*